(12) United States Patent
Young

(10) Patent No.: US 6,296,254 B1
(45) Date of Patent: Oct. 2, 2001

(54) MECHANICAL SEAL ASSEMBLY WITH IMPROVED FLUID CIRCULATION

(75) Inventor: Lionel Allan Young, Murrieta, CA (US)

(73) Assignee: Flowserve Management Company, Irving, TX (US)

(*) Notice: Subject to any disclaimer, the term of this patent is extended or adjusted under 35 U.S.C. 154(b) by 0 days.

(21) Appl. No.: 09/384,312

(22) Filed: Aug. 26, 1999

(51) Int. Cl.$^7$ .................................................. F16J 15/34
(52) U.S. Cl. ........................................................... 277/408
(58) Field of Search ................................... 277/358, 361, 277/408

(56) References Cited

U.S. PATENT DOCUMENTS

| | | |
|---|---|---|
| 2,802,679 * | 8/1957 | Taltavall, Jr. . |
| 2,992,842 | 7/1961 | Shevchenko et al. ............... 286/9 |
| 3,068,012 | 12/1962 | Van Vleet . |
| 3,806,135 | 4/1974 | Wiese . |
| 3,889,960 | 6/1975 | Wiese . |
| 3,937,477 | 2/1976 | Gyory . |
| 4,243,230 | 1/1981 | Baker et al. . |
| 4,445,695 | 5/1984 | Wilkinson . |
| 4,466,619 | 8/1984 | Adams . |
| 4,560,173 | 12/1985 | Adams et al. . |
| 4,699,575 * | 10/1987 | Geisel et al. . |
| 4,759,553 | 7/1988 | Goodman et al. . |
| 5,217,234 * | 6/1993 | Hornsby . |
| 5,827,042 * | 10/1998 | Ramsay . |
| 5,847,479 * | 12/1998 | Wang et al. . |
| 5,909,878 | 6/1999 | Schruüfer . |
| 5,938,205 * | 8/1999 | Azibert et al. . |

FOREIGN PATENT DOCUMENTS

| | | |
|---|---|---|
| 289 875 * | 5/1991 | (DD) . |
| 296 02 685 | 5/1996 | (DE) . |
| 297 13 603 | 11/1997 | (DE) . |
| 97/13084 * | 4/1997 | (WO) . |

* cited by examiner

Primary Examiner—James R. Brittain
Assistant Examiner—John L. Beres
(74) Attorney, Agent, or Firm—Flynn, Thiel, Boutell & Tanis, P.C.

(57) ABSTRACT

A seal assembly for a mechanical seal includes a rotatable shaft with at least one mechanical seal disposed about the shaft, the seal having a rotatable face coupled to the shaft and a stationary face, wherein the respective faces of the seal are in contact with one another, and a chamber for holding a cooling fluid, disposed about the shaft and in communication with the faces of the seal, and a closed loop fluid path disposed about the outer diameter of the shaft, preferably or in a non linear manner, in fluid communication with the chamber, for circulating fluid about the seal faces.

15 Claims, 3 Drawing Sheets

MECHANICAL SEAL ASSEMBLY WITH IMPROVED FLUID CIRCULATION

BACKGROUND OF THE INVENTION

This invention relates to mechanical seals, and more particularly, to a fluid-cooled mechanical seal on a shaft.

A variety of mechanical seals have been developed for use along a shaft, often in the context of pumps. One typical configuration is a mechanical seal with one stationary face and one rotating face. The rotating face of the seal rotates with the shaft of the pump, while the stationary face of the seal is generally coupled to the housing of the pump. In order to provide a tight seal, the two faces are typically in contact with each other. The frictional contact between the faces generates heat.

In order to dissipate heat, a fluid may be added to help transfer the heat away from the seal faces. Typically, a small fluid chamber is disposed about the shaft, so that the fluid is in communication with the seal face. As these mechanical seals are frequently used in a double or tandem configuration, the chamber may be disposed along the shaft, between and including the two mechanical seals. Often, a cooling fluid reservoir is added, with an auxiliary pump to circulate the fluid between the reservoir and the chamber. However, the addition of an auxiliary pump adds cost, requires additional space, and adds another component that is subject to failure, thereby reducing reliability.

There are many applications where a mechanical seal is subjected to fluid at the ID of the face. One of the most common is that of an unpressurized tandem seal where the barrier fluid is in contact with the ID of the primary seal and at the OD of the secondary seal. There is circulation of the barrier fluid into and out of the seal chamber by means of some type of pumping device that is usually part of the secondary seal rotating element. This circulation is adequate for cooling the secondary seal but is less than satisfactory for cooling the primary seal. This lack of cooling performance for the primary seal is due to the inability of the fluid to circulate to the ID of the seal.

Another application where cooling is needed at the seal face is in a vertical pump gear box seal oriented with the gear box oil at the ID of the seal. Gravity ensures that oil is at the ID of the face. However, during dynamic operation this fluid can not circulate with the bulk fluid in the gear box. This leads to increased seal temperature and possibly coking of the oil at one or both of the seal faces. Coking leads to increased leakage and damage to seal faces.

Rather than use an auxiliary pump, other configurations have built a "pumping rotor" into the system. See, e.g., U.S. Pat. No. 4,466,619 to Adams U.S. Pat. No. 4,560,173 to Adams et al. A slotted sleeve is fitted concentrically about the shaft, whereby the rotational movement of the shaft aids in circulating fluid along a fairly linear path, drawing the fluid from the reservoir into the chamber through an inlet, moving it radially around the shaft, and pushing it out of the chamber through an outlet and back into the reservoir. Another type of seal uses screw-type threads on the shaft to move the fluid between an inlet and an outlet. However, the fluid may only be moved in one direction in the chamber, between the inlet and the outlet, and away from the mechanical seal.

Because of the seal mechanisms themselves, it is generally not possible to position an inlet or outlet directly adjacent a seal face. Thus there is a space in the chamber between the inlet and outlet, which define the path of circulation, and the seal face, where the heat is generated and where the fluid will be heated the most. This causes a "dead end" space in the chamber between the seal faces and the respective inlet and outlet, where the cooling fluid is substantially stagnant, and does not circulate with the rest of the fluid. In the "pumping rotor" configuration discussed above, the radial circulating action occurs in a "band" that is aligned with the inlet and outlet; fluid outside this band remains substantially uncirculated. In the screw type circulator discussed above, these dead spots occur on either side of the inlet and outlet, as the fluid is substantially circulated only between the inlet and outlet. In the double or tandem configuration, there is generally a band or path of circulation between the seals, but there is inadequate circulation directly at the seal faces, where circulation is most necessary.

Thus there exists the need for a circulation device for mechanical seals which provides circulation to the seal faces, preferably without the use of auxiliary pumps, which can circulate fluid about the seal faces beyond the respective inlet and outlet locations, and which operates under rotation of the shaft in either direction.

SUMMARY OF THE INVENTION

The present invention is embodied in a cooling assembly for a shaft-mounted mechanical seal, which provides a chamber about the shaft and seal. A closed loop fluid path about the outer diameter of the shaft preferably provides both axial and radial pumping action upon rotation of the shaft, and effectively circulates cooling fluid in the chamber to cool the faces of the seal. The design of the cooling assembly circulates fluid in "dead end" spaces at the seal faces, beyond the location of the inlet or outlet, and more thoroughly circulates the fluid within the chamber. This results in reduced face temperature, elimination of coking and increased seal life.

An important feature of the present invention is the ability to circulate the fluid within the "dead end" space at the opposed faces of the seal. Although fluid cannot be pumped beyond this point, the present invention provides both radial and axial circulation, lifting the heated fluid away from the opposed seal faces and replacing it with cooler fluid.

Another important feature of the present invention is that it operates effectively upon rotation of the shaft in either direction. Thus the mechanical seal remains cooled regardless of the direction of shaft rotation.

The increased circulation the present invention provides also reduces the operating temperature at the seal faces, extending the life of the seal and reducing the chance of failure.

Other features and advantages of the present invention will become apparent from the following description of the preferred embodiments, taken in conjunction with the accompanying drawings, which illustrate, by way of example, the principles of the invention.

DESCRIPTION OF THE DRAWINGS

The details and features of the present invention may be more fully understood by referencing the detailed description and drawings, in which.

DETAILED DESCRIPTION OF THE INVENTION

Figure 1:
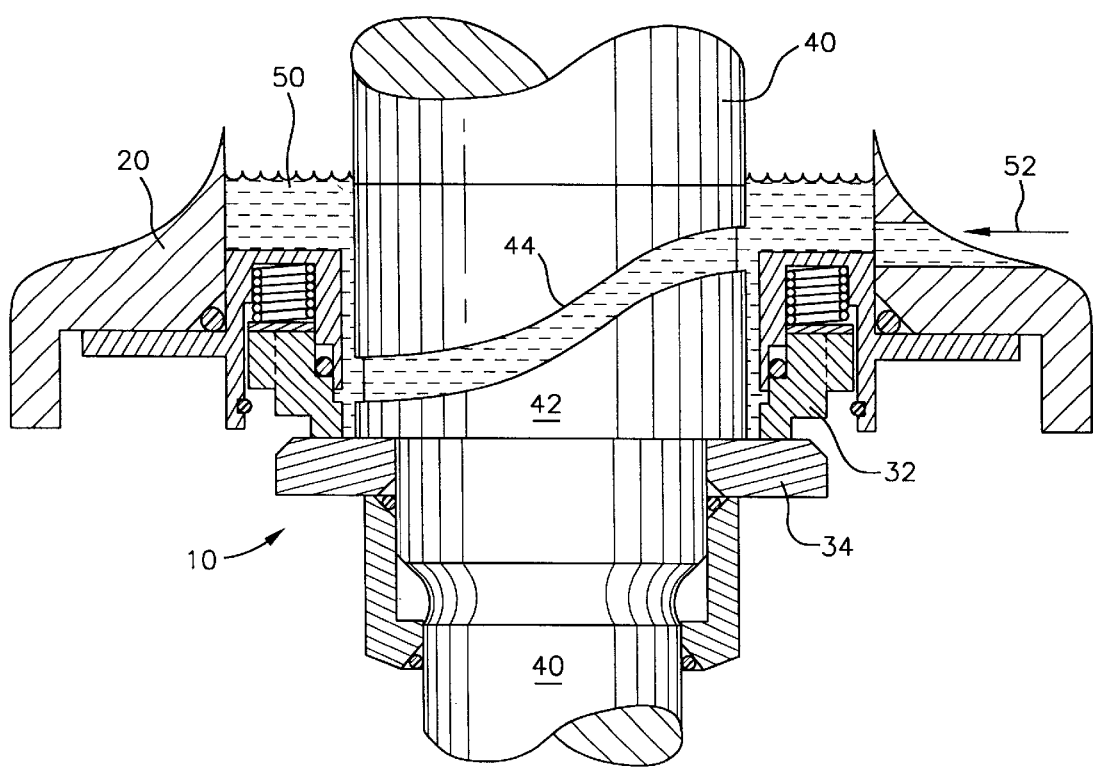
FIG. 1 is an elevation view of a first embodiment of the present invention.

FIG. 1 illustrates a vertical pump gear box seal 10 with oil (or cooling fluid) A at the ID. A housing 20 encloses a mechanical seal 30 disposed about a vertically oriented shaft 40. The seal has two faces—a stationary face 32, coupled to the housing 20, and a rotating face 34, coupled to the shaft 40. The housing 20 also encloses a fluid chamber 50, which contains the cooling fluid A supplied through inlet 52 from a reservoir (not shown). The fluid chamber 50 surrounds the shaft, and provides fluid to the faces of the seal. Preferably, a sleeve 42 is coupled concentrically about the shaft, and the outer surface of the sleeve 42 defines a closed loop fluid path 44. Preferably, the closed loop path is a groove having a base 43 and two spaced apart walls 45 (See FIG. 2).

Figure 2:
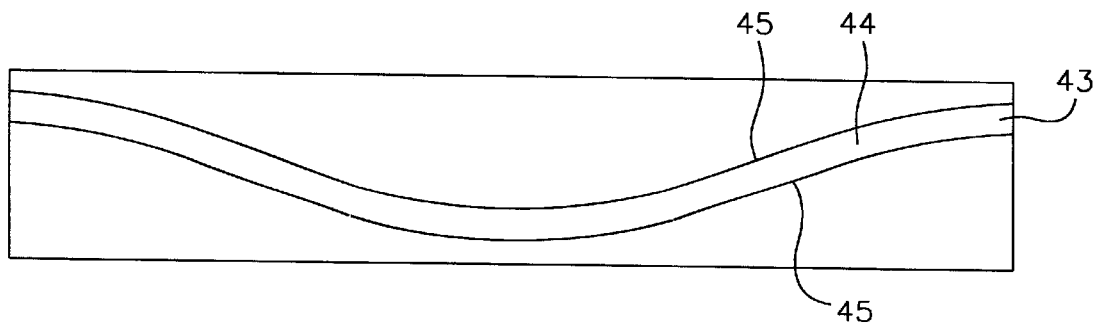
FIG. 2 s a plan view of the sleeve of FIG. 1 with the sleeve shown sectioned and laid flat.

With reference to FIG. 2, the sleeve 42 has been sectioned and laid flat to see the preferred groove that is manufactured (or milled) into the sleeve. The closed loop fluid path 44 is preferably a continuous groove about the sleeve, most preferably sinusoidal in circumferential profile and spanning substantially the axial dimension of the chamber 50. In other words, the high point of the closed loop 44 is near the high point of the chamber 50, while the low point of the closed loop 44 is near the low point of the chamber 50. It will be appreciated by those skilled in the art that the circumferential profile of the closed loop can be a variety of shapes, that preferably substantially spans the axial dimension of the chamber 50. The sinusoidal design, in particular, however, offers excellent cooling performance due to the minimization of turbulence in the oil. Turbulence is reduced because the entrance point (upper right of sleeve in FIG. 1) and the return point (lower left of sleeve in FIG. 1) are tangential to the direction of motion which results in a smooth transition for change in flow direction. Reducing turbulence increases cooling. Alternatively, when no sleeve is used the outer surface of the shaft 40 can define the closed loop fluid path 44.

As the shaft 40 and the sleeve 42 rotate, the closed loop fluid path 44 rotates also. Because the closed loop fluid path substantially spans the axial dimension of the chamber, it appears to move up and down. Viewing the sleeve from a fixed viewpoint, as the shaft rotates the closed loop fluid path appears to oscillate up and down in a sinusoidal fashion. This axial movement takes the cooling liquid from the top of the chamber and "pumps" it down to the face of the seal at the bottom of the chamber, then lifts the heated fluid away from the seal at the bottom of the chamber and brings it to the top. In other words, when oil engages the entrance point in the sleeve groove, it is pumped to the left, because of shaft rotation, as shown by the oil circulation arrow. When it reaches the lower left part of the groove the flow direction is changed to pump the oil back up and out to the bulk of the oil. This results in a constant supply of cooler oil being delivered to the entire ID of the stationary seal face. One advantage to this design is its bi-directionality, i.e., circulation will occur regardless of shaft rotation direction. In addition to the axial motion, the rotational motion of the sleeve and the closed loop fluid path create a radial circulation about the shaft as well. Thus effective circulation of the fluid is achieved, increasing the heat transfer and reducing the temperature at the seal faces.

Figure 3:
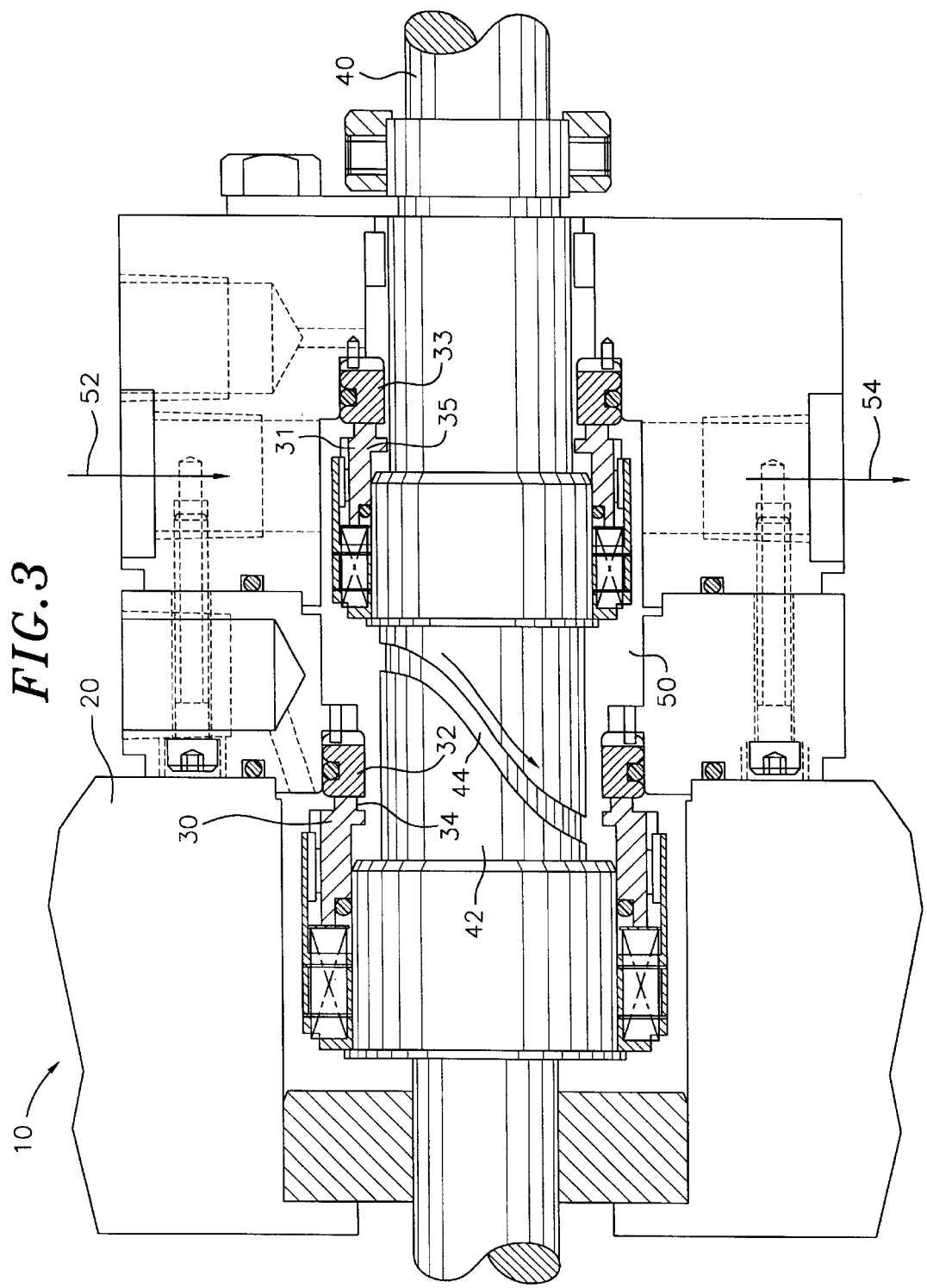
FIG. 3 is an elevation view of a second embodiment of the present invention.

FIG. 3 illustrates another embodiment of the invention, where the shaft 40 is horizontally oriented in a tandem seal or double seal arrangement. A housing 20 encloses two mechanical seals—a primary seal 30 and a secondary seal 31—disposed about a horizontally oriented shaft 40. Each seal has two faces—a stationary face 32,33 coupled to the housing 20, and a rotating face 34,35 coupled to the shaft 40. The housing 20 also encloses a fluid chamber 50, which contains the cooling fluid. The fluid chamber 50 surrounds the shaft, and provides fluid to the faces of the seals. The chamber encloses an area about the shaft from the inner diameter of the primary seal 30, extending along the shaft to the outer diameter of the secondary seal 31.

It will be appreciated by those skilled in the art that the orientation of the seals may be varied without departing from the present invention. In another embodiment, the chamber extends from the outer diameter of the primary seal to the inner diameter of the secondary seal. In yet another embodiment, the chamber extends along the shaft from the inner diameter of the primary seal to the inner diameter of the secondary seal.

A sleeve 42 is coupled concentrically about the shaft, and the outer surface of the sleeve 42 defines a closed loop fluid path 44. The closed loop fluid path 44 is a continuous groove about the sleeve, preferably sinusoidal in circumferential profile. The closed loop fluid path 44 is located partially within the chamber portion containing the primary seal. Distal from this position, and located axially along the shaft at substantially the location of the secondary seal, are the inlet 52 and outlet 54 which communicate with the cooling fluid reservoir (not shown). The pumping action of the closed loop fluid path 44 draws cooling fluid from the inlet, circulates the fluid through the chamber, and expels the fluid to the fluid reservoir through the outlet 54. Preferably, the inlet and outlet are offset radially about the shaft from one another, but are located at substantially the same axial position. However, it will be appreciated by those skilled in the art that the inlet 52 and outlet 54 may be located at other locations.

As demonstrated above, the present invention may be used equally as well in a wide variety of seal configurations. The cooling assembly may be used with a single mechanical seal, as well as in a tandem or double-seal configuration, or configurations utilizing more than two mechanical seals.

Figure 4:
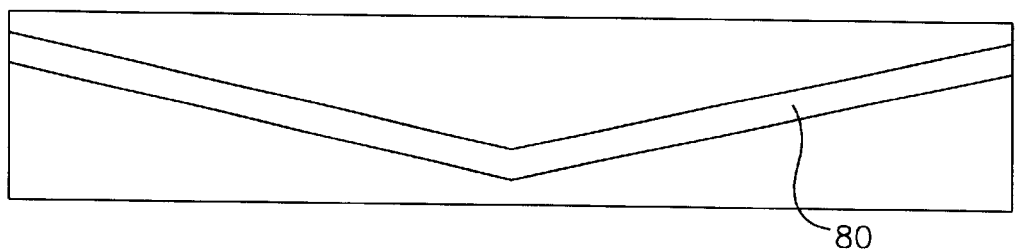
FIG. 4 is a plan view of an alternative embodiment of the sleeve with the sleeve shown sectioned and laid flat.

As noted above, there are many possible variations of the groove design. For example, FIG. 4 illustrates a linear groove design 80 having an angular shape. The sinusoidal groove design of FIG. 2 and the linear groove design of FIG. 4, as well as a plain sleeve, were tested in the laboratory. Face temperature was measured and a comparison is shown in Table 1 below.

TABLE 1

Comparison of Sleeve Designs

| Sleeve Design | Face Temperature (° F.) |
|---|---|
| Plain Sleeve | 290 |
| Linear Groove (FIG. 4) | 260 |
| Sinusoidal Groove (FIG. 2) | 208 |

Whereas the linear groove sleeve shows an improvement over a plain sleeve, the sinusoidal groove offers significant cooling over both.

Although the invention has been described in detail with reference only to the preferred embodiments, those having ordinary skill in the art will appreciate that various modifications can be made without departing from the spirit and scope of the invention. Accordingly, the invention is defined with reference to the following claims.

What is claimed is:

1. A mechanical seal assembly comprising:
   a rotatable shaft;
   a mechanical seal disposed about the shaft, the seal having a rotatable face coupled to the shaft and a stationary face, wherein the respective faces are in opposed relation to one another to form a seal;
   a chamber for holding a cooling fluid, the chamber disposed about the shaft and in communication with the faces of the seal; and
   a closed loop fluid path disposed about the outer diameter of the shaft, in fluid communication with the chamber, for circulating fluid to and from the seal faces. wherein the closed loop fluid path is sinusoidal in circumferential profile.

2. The seal assembly as in claim 1, further comprising a sleeve coupled to and disposed concentrically about a portion of the shaft, wherein the closed loop fluid path is disposed on the outer diameter of the sleeve.

3. The seal assembly as in claim 2, wherein the closed loop fluid path is defined by two spaced apart wall surfaces protruding radially perpendicular from the sleeve.

4. The seal assembly as in claim 2 wherein the closed loop fluid path is a groove in the sleeve.

5. The seal assembly of claim 2, wherein the closed loop fluid path extends to the inner diameter of the seal faces.

6. A mechanical seal assembly comprising:
   a rotatable shaft;
   a mechanical seal disposed about the shaft, the seal having a rotatable face coupled to the shaft and a stationary face, wherein the respective faces are in opposed relation to one another to form a seal;
   a chamber for holding a cooling fluid, the chamber disposed about the shaft and in communication with the faces of the seal;
   an endless loop fluid path extending about the outer diameter of the shaft and disposed throughout the length thereof in fluid communication with the chamber for circulating fluid to and from the seal faces, wherein the endless loop fluid path at least in part extends both axially and circumferentially of the shaft to provide both radial and axial pumping action upon rotation of the shaft.

7. The seal assembly of claim 6, wherein the endless loop fluid path comprises a single endless annular groove which encircles the shaft and is angled axially away from a plane which transversely intersects the shaft.

8. The seal assembly of claim 7, wherein the groove at a first circumferential location therealong communicates with the chamber in the vicinity of the inner diameter of the seal faces, and wherein the groove at a second circumferential location therealong communicates with the chamber at a point which is spaced axially a substantial distance from the inner diameter of the seal faces, said first and second locations being disposed on substantially diametrically opposite sides of the shaft.

9. The seal assembly of claim 7, wherein a sleeve is coupled to and disposed concentrically about a portion of the shaft, and wherein the endless loop fluid path is defined on the outer diameter of the sleeve.

10. The seal assembly of claim 9, wherein the chamber includes an axially elongate annular part which is defined within the mechanical seal in surrounding relationship to the sleeve, and wherein the groove defining the closed loop fluid path is formed in an exterior peripheral surface of the sleeve for fluid communication with the axially elongate annular part of the chamber.

11. A mechanical seal assembly comprising:
    a rotatable shaft;
    a mechanical seal disposed about the shaft, the seal having a rotatable face coupled to the shaft and a stationary face, wherein the respective faces are in opposed relation to one another to form a seal;
    a chamber for holding a cooling fluid, the chamber disposed about the shaft and including an axially elongate annular chamber portion defined between opposed surfaces of the shaft and the mechanical seal and being in communication with the faces of the seal; and
    a closed loop fluid path disposed about the outer diameter of the shaft in fluid communication with the chamber for circulating fluid to and from the seal faces, wherein the closed loop fluid path is an endless annular groove which opens radially in fluid communication with said annular chamber portion and has groove parts which project axially of the shaft as they extend circumferentially thereof to effect both radial and axial pumping of the cooling fluid in response to shaft rotation.

12. The seal assembly of claim 11, wherein the axially elongate annular chamber portion communicates with the inner diameter of the seal faces, wherein one said groove part of the fluid path extends circumferentially around one side of the shaft axially between first and second locations which are axially spaced, wherein a second said groove part of said path extends circumferentially around the other side of the shaft and extends axially between said first and second locations, wherein said second location communicates with the axially elongate annular chamber portion in the vicinity of the inner diameter of the seal faces, and wherein said first location communicates with the axially elongate annular chamber portion axially remote from the inner diameter of the seal faces.

13. The seal assembly of claim 12, wherein a sleeve is coupled to and disposed concentrically about a portion of the shaft and defines an inner surface of the axially elongate annular chamber portion.

14. The seal assembly of claim 13, wherein the groove is defined in an outer annular surface of the sleeve.

15. The seal assembly of claim 12, wherein the first and second groove parts are positioned on diametrically opposite sides of the shaft and are configured so that one of said groove parts effects pumping of fluid axially toward the seal faces irrespective of the direction of shaft rotation.

* * * * *